G. J. Parham,
Fruit Gatherer.
No. 93,338.        Patented Aug. 3, 1869.
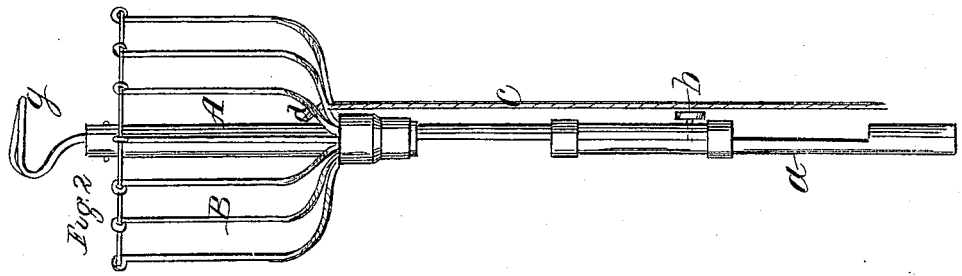
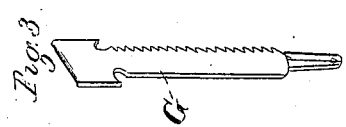
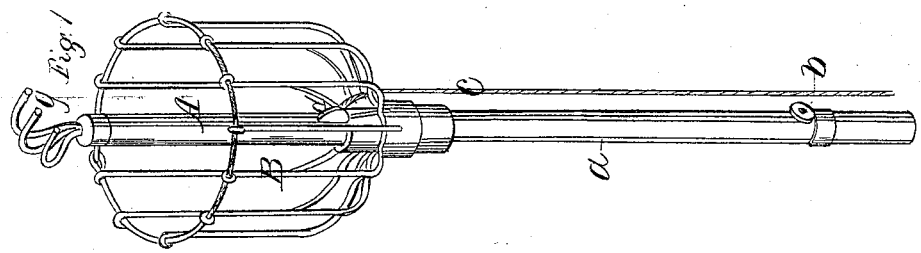
Witnesses
Inventor
Geo. J. Parham

United States Patent Office.

GEORGE J. PARHAM, OF HARRODSBURG, INDIANA.

Letters Patent No. 93,338, dated August 3, 1869.

IMPROVEMENT IN FRUIT-PICKER.

The Schedule referred to in these Letters Patent and making part of the same.

*To all whom it may concern:*

Be it known that I, GEORGE J. PARHAM, of Harrodsburg, in the county of Monroe, and State of Indiana, have invented certain new and useful Improvements in Fruit-Pickers; and I do hereby declare that the following is a full, clear, and exact description thereof, reference being had to the accompanying drawings, and to the letters of reference marked thereon, which form a part of this specification, and in which—

Figure 1 represents a perspective view,

Figure 2, a side view, and

Figure 3, a perspective view of the saw of my fruit-picker.

Similar letters indicate like parts in all the figures.

The nature of my invention consists in the employment of a shaft, provided with a sliding basket, for holding the fruit, and also with a hook, for removing the fruit from the tree.

My invention further consists in the employment of a knife, at the end of the shaft, to act as a pruning-knife, substantially as hereinafter described.

To enable others skilled in the art to which my invention appertains, to make and use the same, I will now describe its construction and operation.

In the accompanying drawings—

A represents the shaft or stem, which consists of the adjustable piece *a*, operated by means of the thumb-screw *b*, for lengthening or shortening the stem.

B represents a wire basket, made as seen in figs. 1 and 2, and sliding up and down the stem A.

*c* represents a cord, one end of which is attached to the slide on the basket, and the other end passed up and over the pulley *d*, secured in a projection attached to the stem A.

By this arrangement the fruit is removed from the basket, after the same is lowered.

Having thus described my invention,

What I claim as new, and desire to secure by Letters Patent, is—

1. The hand or stem A, provided with metal bands, and thumb-screw *b*, substantially in the manner and for the purpose described.

2. A fruit-picker, consisting of stem A, thumb-screw *b*, basket B, pulley *d*, cord *c*, and hook *g*, all combined, arranged, and operating substantially in the manner and for the purpose set forth.

In testimony that I claim the foregoing as my own, I affix my signature, in presence of two witnesses.

GEORGE J. PARHAM.

Witnesses:
JOHN R. EAST,
JAMES SMITH.